United States Patent [19]
Zachau et al.

[11] Patent Number: 5,715,585
[45] Date of Patent: Feb. 10, 1998

[54] WORK PIECE MACHINING SYSTEM

[75] Inventors: Henning Zachau, Weinböhla; Winfried Ehrhardt; Siegfried Staudenmaier, both of Laubach; Fritz Kirchner, Ettinghausen, all of Germany

[73] Assignee: A. Roemheld GmbH & Co. KG, Laubach, Germany

[21] Appl. No.: 527,108

[22] Filed: Sep. 12, 1995

[30] Foreign Application Priority Data

Sep. 13, 1994 [DE] Germany ............... 44 32 290.9
Sep. 13, 1994 [DE] Germany ............... 44 32 289.5

[51] Int. Cl.⁶ .................................................. B23Q 3/02
[52] U.S. Cl. ................... 29/33 P; 198/345.3; 198/346.1; 409/221
[58] Field of Search ................... 29/33 P, 563; 409/219, 220, 221, 225; 269/20; 414/676, 903; 198/345.3, 346.1, 465.1; 180/125

[56] References Cited

U.S. PATENT DOCUMENTS 3,807,035   4/1974  Moorman .................................. 29/563
4,627,362  12/1986  Ise et al. ................................ 104/23.2
4,729,192   3/1988  Elsdoerfer ........................... 409/224 X
4,999,894   3/1991  Berry et al. ............................. 29/33 P
5,158,487  10/1992  Varnau ................................... 29/33 P
5,283,934   2/1994  Zimpel et al. ........................... 29/33 P

*Primary Examiner*—William R. Briggs
*Attorney, Agent, or Firm*—W. G. Fasse; W. F. Fasse

[57] ABSTRACT

A system for machining work pieces includes an assembly stand (1) for holding a work piece (6) and carrying the work piece to successive machining stations, and includes an assembly device or machining station (101) that holds a machining tool and receives the work piece to carry out a machining operation. The assembly stand includes a work piece receiving apparatus (3) mounted on a pallet (2) that has sliding and fixing elements (11) mounted on its underside. Each element (11) includes a bell-shaped flexible suction cup member (13). When pressurized air is applied to the suction cup members, the assembly stand floats on a cushion of air so that it can be easily moved. When vacuum is applied to the suction cup members, the assembly stand is firmly fixed in position on a work table. The assembly device (101) includes a tool receiving arm (104) and a support arm (105) attached to an assembly yoke (102) that is vertically movable to receive and adjust to the height of the work piece in an automatic or floating manner.

22 Claims, 7 Drawing Sheets

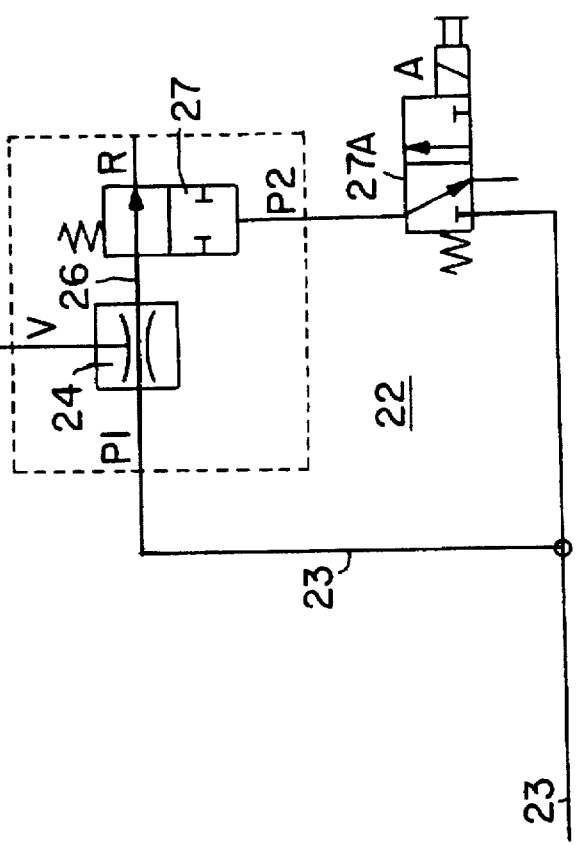
FIG.4

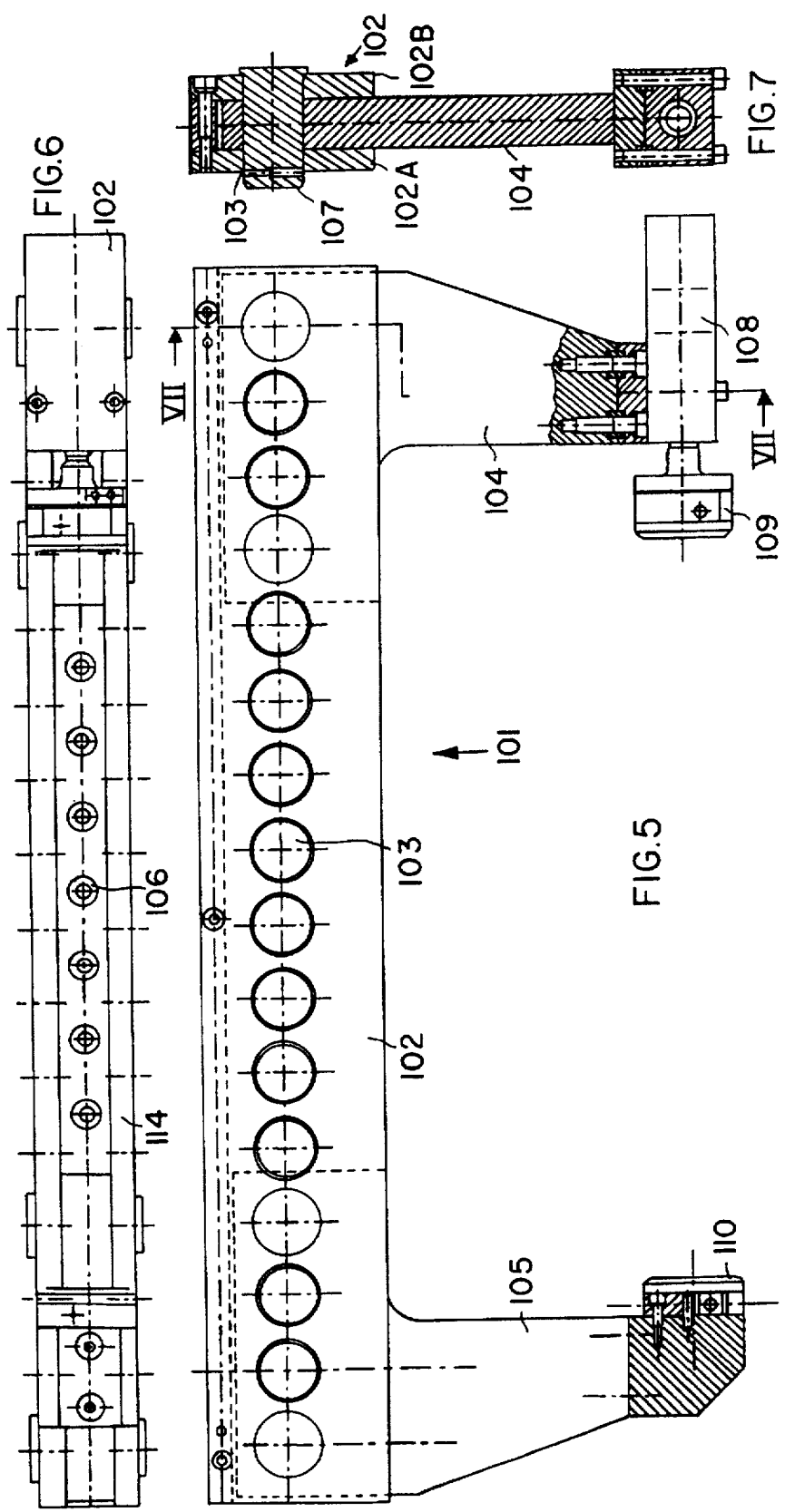

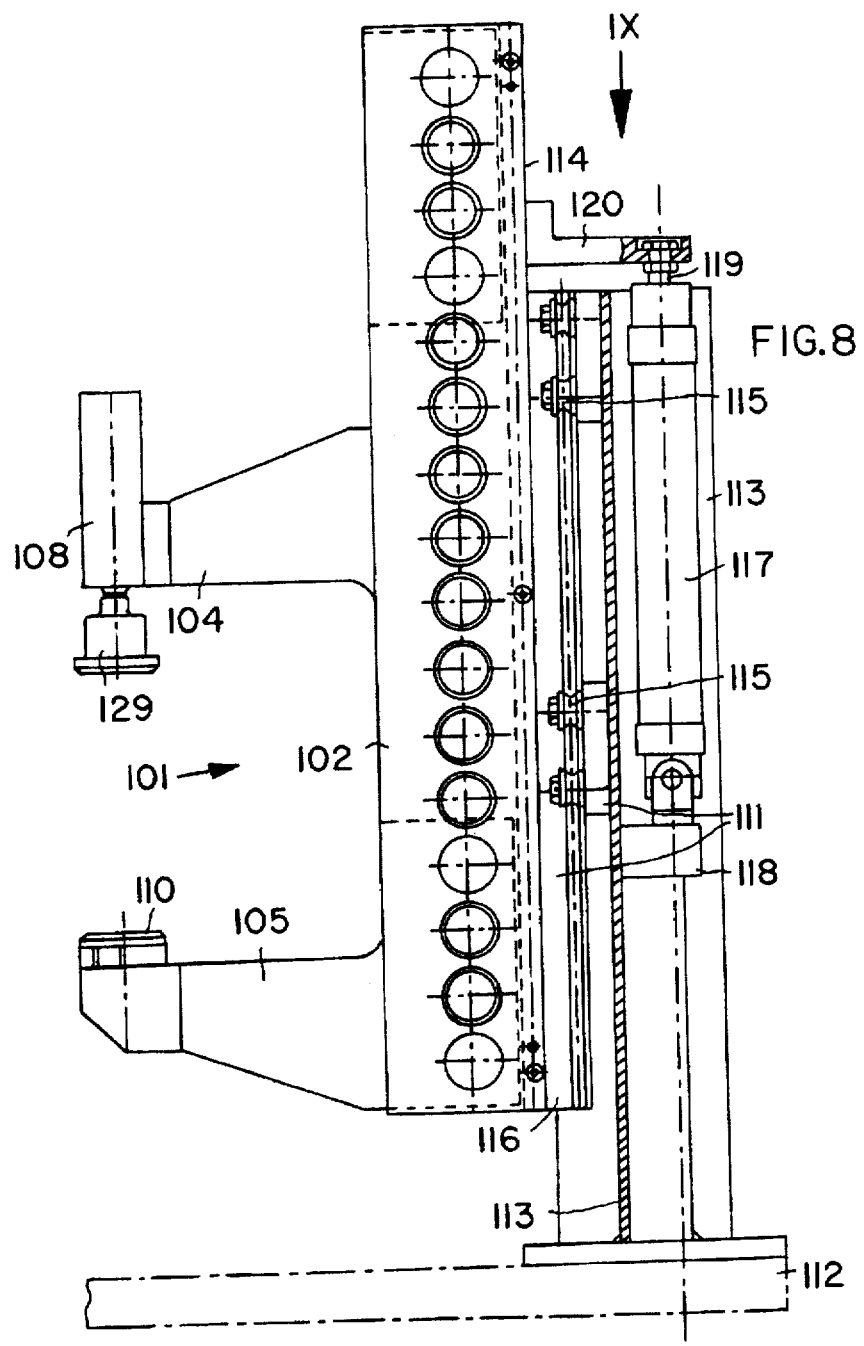
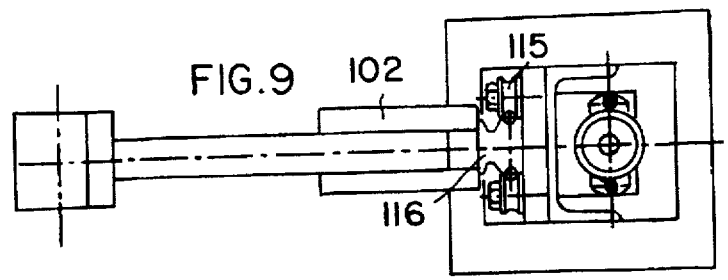

WORK PIECE MACHINING SYSTEM

FIELD OF THE INVENTION

The invention relates to a work piece machining system wherein a work piece is mounted on a clamping apparatus arranged on a pallet that is movably arranged on a work table. The invention further relates to a work station arranged on the work table for machining the work piece held by the clamping apparatus.

BACKGROUND INFORMATION

It is generally known to provide so-called assembly lines for carrying out production assembly operations, wherein various machine tools are arranged one after another in sequence at respective fixed locations and the work piece to be machined or otherwise processed is moved from one tool station to the next after each machining process. It is also known to transport the work pieces on a conveyor belt from one location to the next, i.e. from one machining station to the next. However, the tool is mounted in a fixed position so that each work piece must be particularly repositioned and then clamped into the particular new position for each machining process, i.e. at each respective machining station.

In known work piece machining systems, the work piece is thus sequentially delivered to various machining devices, which are each laid out to perform a particular machining operation. Alternatively, machining devices are also known, which include various machining apparatus or machining tools that are sequentially moved into an operating position by rotating or tilting the machining device. For all of these devices, it is necessary that the work pieces to be machined are presented to the device in a precise position and then secured in a proper, exact position for the respective machine tool to carry out the machining operation.

OBJECTS OF THE INVENTION

In view of the above it is the aim of the invention to achieve the following objects singly or in combination:

- to provide a machining system for a work piece, wherein the work piece is only clamped into a clamping or holding device once, yet the work piece can be easily transported to each of the required machining procedures or machining stations;
- to provide such a machining system in which the work piece is held in such a manner that its position is easily variable, so that the machining can take place on several sides of the work piece;
- to provide such a system in which a work piece receiving or holding device can be easily moved to any desired location on a work table and then securely fixed in any such desired position by the simple switching of a controller unit;
- to provide a work piece machining system that includes an assembly device that allows various machine tools to be mounted thereon and allows a rapid exchange or replacement of the tools;
- to provide such a work piece machining system including an assembly device that automatically adjusts itself to the proper height corresponding to the respective height of the work piece to be machined; and
- to provide such a work piece machining system that combines a freely movable work piece receiving apparatus to carry and move a work piece from one work station to another, and an assembly device for carrying a machining tool and receiving the work piece in an automatic height adjusting manner at a respective machining station.

SUMMARY OF THE INVENTION

The above objects have been achieved in a machining system according to the invention, including a work piece receiving apparatus mounted on a pallet that can be moved to any desired position and then fixed at that position on a work table. A plurality of sliding and fixing elements are mounted on the bottom surface of the pallet and are each connected, preferably at their center, to a compressed air system through a pneumatic control unit. The pneumatic control unit can carry out an airflow reversal to selectively supply compressed air to, or evacuate air from, the sliding and fixing elements. When compressed air is provided to the elements, an over-pressure results in the elements, so that the elements and therewith the pallet lift off and hover slightly above the work table on an air cushion, whereby the pallet can be easily moved across the work table. When the flow of air is reversed, an underpressure or vacuum arises in the elements, so that the elements are vacuumed onto the work table to securely fix the pallet in a desired position.

The advantage of the invention is that all machining operations can be carried out in sequence at different locations or machining stations, including all machining or processing steps up to final testing and release of the finished work piece, because each work piece is held as needed in a work piece receiving apparatus that can be easily moved from station to station. A further advantage is that transporting the work pieces from station to station requires essentially no exertion of force, and the work pieces can be positioned easily and exactly as needed for each machining operation.

According to a second aspect of the present invention, the above objects are achieved in a machining system including a tool receiving apparatus that comprises a U-section shaped assembly yoke having a plurality of holes therethrough to receive machining and support elements therein at desired positions. A linear guide movably attaches the assembly yoke to a stand that is rigidly mounted on a base plate. A rotationally fixed tool receiving device is mounted on the machining element to receive a selected tool in an interchangeable manner.

The advantage of this aspect of the invention is that various tools can very quickly be mounted as needed and put into operation at the respective machining station. Another advantage is that the height of the tool automatically adjusts to the height of the respective work piece, and the tool and its counter-surface formed by the support element are substantially free-floating, so that only machining forces and not the weight of the work piece are transmitted through the assembly yoke.

BRIEF DESCRIPTION OF THE DRAWINGS

In order that the invention may be clearly understood, it will now be described, by way of example, with reference to the accompanying drawings, wherein:

FIG. 4 is a pneumatic circuit diagram of the pneumatic control system for the apparatus shown in FIG. 1;

FIG. 5 is a schematic view of the assembly yoke carrying a machining element and a support element, of an assembly device for carrying a machining tool according to the invention;

FIG. 6 is a side view of the assembly yoke shown in FIG. 5;

FIG. 7 is a section through the machining element and the assembly yoke along line VII—VII as shown in FIG. 5;

FIG. 8 is a schematic view of a linear guide that movably carries and guides the assembly yoke shown in FIG. 5;

FIG. 9 is an end view in the direction of arrow IX of the linear guide shown in FIG. VIII;

Figure 1:
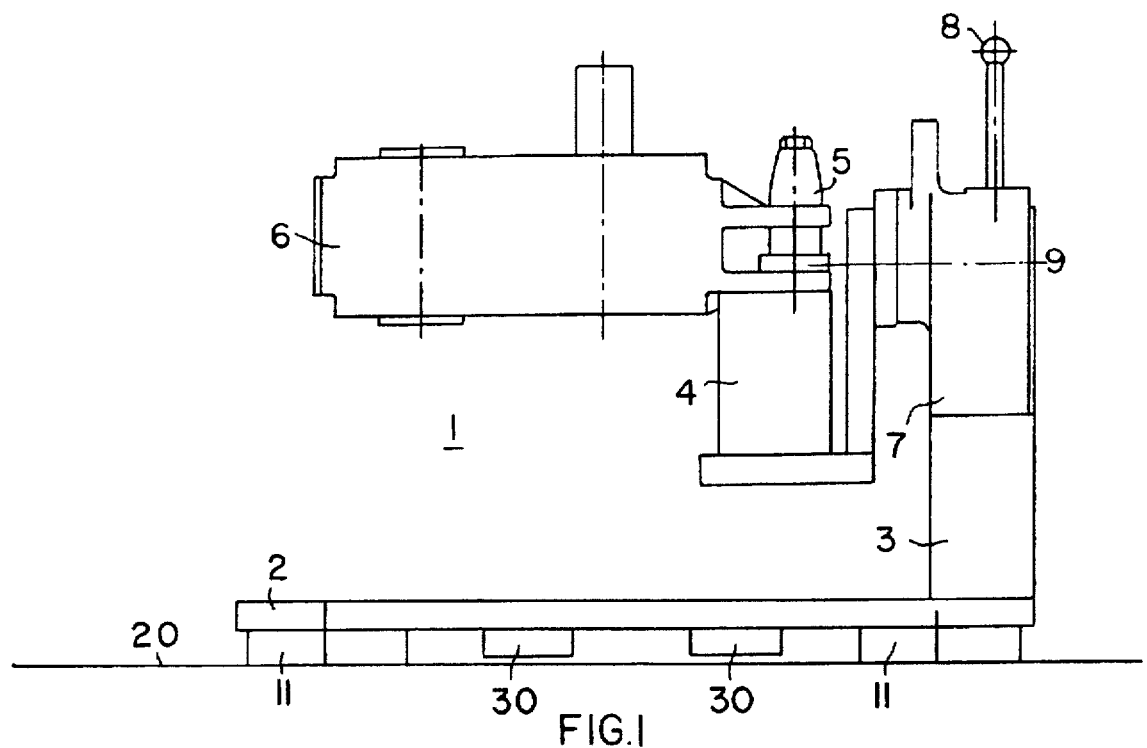
FIG. 1 is a schematic elevation view of the general structure of an assembly device for receiving and carrying work pieces, according to the invention.
Figure 2:
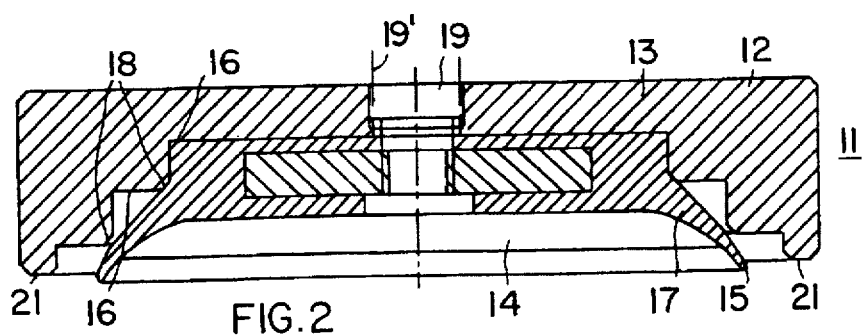
FIG. 2 is an enlarged sectional view of a sliding and fixing element mounted on the bottom of the apparatus shown in FIG. 1.
Figure 3:
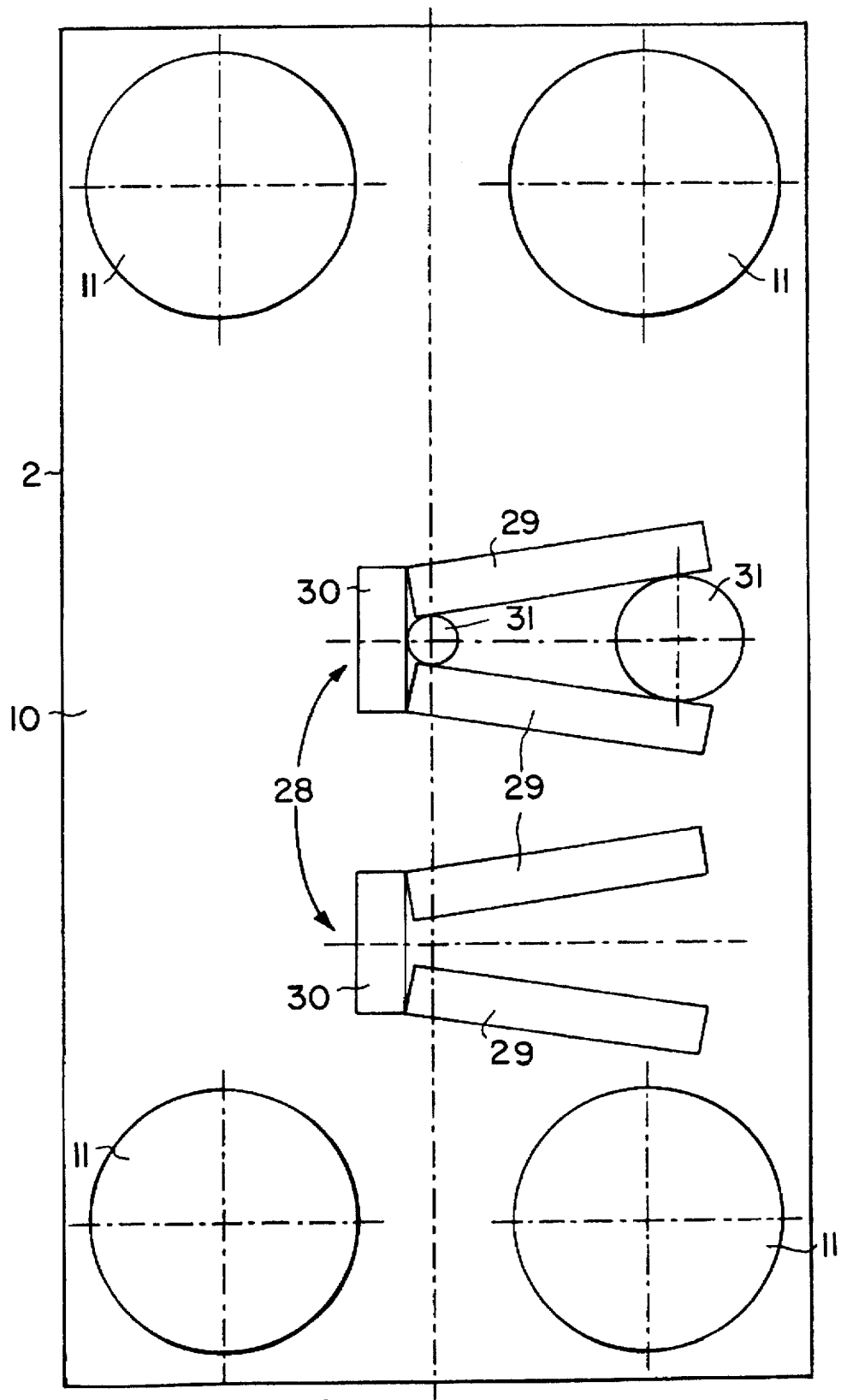
FIG. 3 is a schematic plan view of the bottom of the assembly pallet of the apparatus shown in FIG. 1.

DETAILED DESCRIPTION OF PREFERRED EXAMPLE EMBODIMENTS AND OF THE BEST MODE OF THE INVENTION

FIGS. 1 to 4 show an example embodiment of a first aspect of the present invention, which will now be described in detail. It should be understood that the work piece machining system according to the invention relates to a work table or platform 20 on which several assembly apparatus and several machining devices can be arranged. The first aspect of the invention relates especially to an assembly stand or apparatus 1 that comprises a pallet 2 equipped with a work piece receiving apparatus 3. The work piece receiving apparatus 3 is equipped with a work piece clamping apparatus 4, which includes a receiving mandrel or arbor 5 onto which the work piece 6 can be clamped. The clamping apparatus 4 is rotatably supported on a tilt or swivel head 7 of the work piece receiving apparatus 3. This tilt or swivel head 7 allows the work piece 6 to be tilted or swiveled in four positional attitudes so that the work piece 6 can be brought into four different machining positions. In order to achieve this, the positioning lever 8 is operated, whereby each operation of the lever 8 through its tilting range tilts the work piece by 90°. The work piece clamping apparatus 4 is thus rotated about the rotational axis 9. In this manner, the work piece 6 may be brought into four different machining positions, which allow a vertical as well as a horizontal machining of the work piece 6. Thus, the work piece receiving apparatus 3 is adapted to rotate the work piece 6 about at least a horizontal first axis and a second axis orthogonal to the first axis.

The key inventive feature of this assembly stand 1 is the pallet 2 with its attached special equipment and the various possibilities achieved thereby. Four sliding and fixing elements 11 are arranged on the bottom side or bottom surface 10 of the pallet 2. Each of the sliding and fixing elements 11 is a substantially circular shaped element comprising a metal body 12 and an insert member 13 made of an elastic material, preferably rubber. The insert member 13 has a bell- or cup-shaped form enclosing therein a hollow chamber 14 that is sealed or enclosed against the work table 20 by the encircling lip bead 15 of the sidewall rim or lip 17 of the insert member 13. The metal body 12 is appropriately formed to receive the insert member 13, namely the metal body 12 has a stepped recess therein with steps 16. The steps 16 have rounded edges 18 and are configured such that the sidewall rim or lip 17 of the insert member 13 rests smoothly against the rounded edges 18. Furthermore, the lowest step 16 has a larger diameter than the outer diameter of the insert member 13, whereby it is achieved that the element 11 operates essentially noiselessly.

A through-going bored hole 19 is provided in the center of each of the elements 11, to provide an open connection from the hollow chamber 14 to the upper part of the metal body 12. In the metal body 12, a hose, conduit or channel 19' is connected to the bored hole 19 so as to deliver pressurized air to or remove air from the hollow chamber 14 through the conduit or channel. The channel 19' is preferably directed within the pallet 2 so that all of the plural channels coming from the plural sliding and fixing elements 11 join together and end in a single connector member.

The several elements 11 provided on the bottom side 10 of the pallet 2 thus form the legs or feet on which the pallet 2 stands on the work table 20, which has a flat surface. The top surface of the work table 20 may, for example, be a metal plate with a smooth top surface, which does not require any special machining or treatment, however. When the pallet 2 is connected to a source of compressed air, two control functions can be carried out. If the compressed air is directed into the system of conduits or channels 19' of the pallet 2, then the compressed air will be emitted into the center of each of the sliding and fixing elements 11, where the supplied air will pass through the bored hole 19 into the hollow chamber 14 and achieve an over-pressurization of the bell-shaped insert member 13, and then finally escape from around the lip bead 15. The over-pressurized state that builds up in the hollow chamber 14 lifts the entire pallet 2 by about 1 mm, so that it essentially hovers on a thin air cushion. Thereby, friction between the pallet 2 and the work table 20 is substantially eliminated so that the pallet 2 can be easily moved by sliding over the work table 20 on the thin air cushion. Experiments have shown that the pallet 2 that has been provided with pressurized air will start to move completely by itself if the work table 20 is tilted by even the slightest amount. For this reason, the work table 20 has an upward projecting rim around its perimeter.

If the direction of air flow is reversed, then air will be sucked out of the channel system 19' and thus out of the hollow chambers 14. An under-pressurized state, i.e. a negative pressure or partial vacuum, will be created in each hollow chamber 14, so that the lip beads 15 of the insert members 13 will be tightly pressed or sucked onto the work table 20. The pallet 2 will be lowered until the smooth rims 21 of the metal bodies 12 come to rest upon the work table 20. The step configuration of the recess within the metal body 12, as well as the elastic rim or lip 17 with its lip bead 15 in each of the sliding and fixing elements 11, provide a tight seal so that a vacuum can be established and maintained in the hollow chambers 14. Thus, the sliding and fixing elements 11 act like suction cups, and the pallet 2 is immovably held tightly on the work table 20, even if substantially great forces are applied to the pallet 2 as a result of machining the work piece 6.

The above described reversible control of the air flow, i.e. the reversal of the air flow direction, is achieved with a pneumatic control unit 22, which will now be described with reference to FIG. 4. Pressurized air is directed into the system through a channel 23. An ejector 24 is arranged in the channel 23. In the ejector 24, the channel 23 branches into a connector or distributor channel 25 that leads into the pallet 2 and an outlet channel 26. A valve 27 is arranged in the outlet channel 26 and enables the channel 26 to be opened or closed to the surrounding ambient environment.

When pressurized air is supplied into the channel 23 and valve 27 is closed, then the pressurized air flows through the ejector 24 into the connector distributor channel 25 and from there into the pallet 2 and into each of the sliding and fixing elements 11. Thus, an over-pressurized condition will be achieved under the pallet 2 in each of the elements 11. However, if the valve 27 is opened while pressurized air is supplied to the channel 23, then the air will flow through the ejector 24 to the outlet channel 26 and from there into the outside ambient environment. Simultaneously, as the pressurized air flows through the ejector to the ambient environment, air is sucked out of the distributor channel 25, for example by a Venturi effect, so that a mixed air flow of the supplied pressurized air as well as the air sucked out of the elements 11 is ejected out of the outlet channel 26. In this manner, an under-pressurized state is achieved in each of the elements 11 under the pallet 2, so that the pallet is sucked tightly onto the work table 20. The above described control process is thus carried out with a single control valve. If desired, the control valve 27 can be actuated by an actuator valve 27A, which selectively couples or decouples an actuating end of the control valve 27 to the pressurized air provided in channel 23. The easy movability of the pallet 2 makes it possible to quickly put an assembly stand 1 or other equipment mounted on the pallet 2 into operation in a particular position, and to quickly reposition the equipment mounted on pallets 2 into various desired positions and configurations on the work table 20. Thus, such a work table 20 can be equipped with several and various machining devices which carry out various machining processes. For example, the assembly stand 1 with a work piece 6 mounted thereon can quickly and easily be moved to a first machining device such as a press, and once the first machining process is completed, the assembly stand 1 can be quickly and easily moved to the second machining device, for example a drilling machine, and then to successive machining stations in a similar manner. By these means it is easy to configure and assemble a production line or assembly line extending all the way to work stations for final work piece removal and testing.

The mobility of the above described system is especially practical, when the pallet 2 can be moved to each machining device in such a manner that it is simultaneously, i.e. automatically, positioned for properly presenting the work piece 6 to the respective machining device, and thus avoiding extra auxiliary devices or steps for positioning the work piece. For this purpose, the pallet 2 is provided with a positioning mechanism 28, which will now be described with reference to FIG. 3. The positioning mechanism 28 comprises guide rails 29 mounted on the bottom side 10 of the pallet 2. Respective pairs of these guide rails 29 each form a V-shape that is open toward the front and closed at the back by a cross rail 30. Various disks 31 having various diameters are mounted in appropriate positions on the work table 20 in the area of a machining device. When the pallet 2 is moved into the area of the machining device, the V-shaped space between the guide rails 29 guidingly receives and cooperates with the disks 31 to properly position the pallet 2 and therewith the assembly stand 1 and the work piece 6 relative to the machining device. Then a vacuum is applied to the sliding and fixing elements 11 to fix the assembly stand 1 and therewith the work piece 6 in the proper machining position.

The disks 31 can be arranged on the work table 20 in a position adjustable manner, for example, in guide grooves or slidable disk rails having elongated slots for securing them. The thickness of the guide rails 29 and cross rails 30 is dimensioned so that they do not come to rest on the work table 20, even when the pallet 2 is lowered into its fixed position, so that the rails 29 and 30 will not interfere with the sliding repositioning of the assembly stand 1.

A second aspect of the invention will now be described with reference to FIGS. 5 to 11, which show an assembly device or machining station that may be arranged at any desired location on the work table described above. Each assembly device or machining station receives a work piece presented to it by the above described assembly stand 1, and then performs a machining operation on the work piece.

The assembly device or machining station 101 is equipped with an assembly yoke 102, which in turn holds and transmits force into a machining element or arm 104 and a support element or arm 105. The work piece 6 will be received between the arm 104 and the arm 105. The assembly yoke 102 is U-shaped in cross-section, with shanks or side plates 102A and 102B, and the machining element 104 and support element 105 are received and secured in the open U-shaped channel. For this purpose, the shanks or side plates 102A and 102B of the yoke 102 have a plurality of through-going bores forming receiving holes 103, preferably spaced from one another by the absolute minimum possible distance along the length of the yoke 102. These exact-fit, counter-facing holes 103 can be interconnected by securing bolts 107. The elements or arms 104 and 105 are correspondingly provided with holes in the portion of the arms inserted into the U-shaped channel of the assembly yoke 102. In this manner, essentially any desired spacing distance between the two elements 104 and 105 can be achieved, and the height of the elements 104 and 105 above the work table or base plate 112 (that may be mounted on the work table 20 discussed above) can be varied or adjusted as needed.

Moreover, the elements 104 and 105 are reversible, that is to say, by reversing a respective one of the elements, it is possible to machine the interior areas of a work piece. It is decisive in this context, that solely the assembly yoke 102 totally determines the introduction of forces into the work piece, and that the forces introduced between the elements 104 and 105 for machining the work piece are completely supported by the assembly yoke 102, which is correspondingly appropriately arranged.

As shown in FIG. 8, the total suspension of the assembly yoke 102 is improved by including a linear guide 111. The entire device 101 is mounted on or carried by a post or stand 113, which in turn is mounted on the base plate or work table 112 to extend vertically therefrom. The linear guide 111 is effective between the stand 113 and the assembly yoke 102. Rollers 115 are arranged in pairs at a prescribed spacing distance along the stand 113, so that a glide rail 116 can be guided between the rollers 115. This glide rail 116 is approximately double T-shaped and has edges that are rounded and fitted to the rollers 115 at the areas where the glide rail 116 contacts the rollers 115. The glide rail 116 is screwed onto the bottom or back side 114 of the assembly yoke 102 by bolts or screws or the like arranged in holes 106.

A cylinder 117 is provided for the stand 113, whereby the bottom end of the cylinder 117 is rigidly connected to the stand 113 by a mounting block 118. The cylinder 117 is effective in the lengthwise direction, that is to say vertically, along the stand 113. The piston rod 119 of the cylinder 117 is rigidly connected to the assembly yoke 102 by a dog or carrier plate 120. When the cylinder 117 is pressurized, the piston rod 119 rises and thereby lifts up the carrier plate 120 and therewith the entire assembly yoke 102. During its stroking motion, the yoke 102 is guided in the linear guide 111 in that the glide rail 116 glides along between the rollers 115.

The pressure that is applied in cylinder 117 should only be so great, i.e. should be just sufficient that it just barely overcomes the weight of the assembly yoke 102 including all of the auxiliary components and apparatus mounted on the yoke 102. In this manner, it is ensured that the elements or arms 104 and 105 are always brought into a working position in which the support element 105 comes to rest against or contact the work piece 6 that is to be machined. Since the machining forces are only effective between the two elements 104 and 105 on the one hand, and in the assembly yoke 102 on the other hand, no further forces arise which could have negative effects on the work piece. By this arrangement, a so-called floating work piece reception is achieved with regard to the machining elements or arms 104. In other words, the weight of the work piece is not supported by the support element 105, but rather the assembly yoke 102 will automatically self-adjust to floatingly receive and engage the work piece while applying only machining forces through the arms 104 and 105 into the work piece and correspondingly through the assembly yoke 102.

In the example embodiment shown in the drawings, the machining element 104 is a tension and compression element, which is used for pressing and detaching, for example. Alternatively, any other desired tools or machining elements can be brought into play, such as drilling tools, lathe tools, grinding tools, polishing tools and the like. The decisive point is that all of these tools may be quickly and safely exchanged or replaced. For this purpose, the assembly device 101 according to the invention is equipped with a tool receiving apparatus 108, which fulfills several purposes. First, a quick exchange of tools is to be enabled, secondly, the tools are to be rotationally securely mounted, and finally the force-locking or friction-fit character of the mounting is to be improved.

Figure 10:
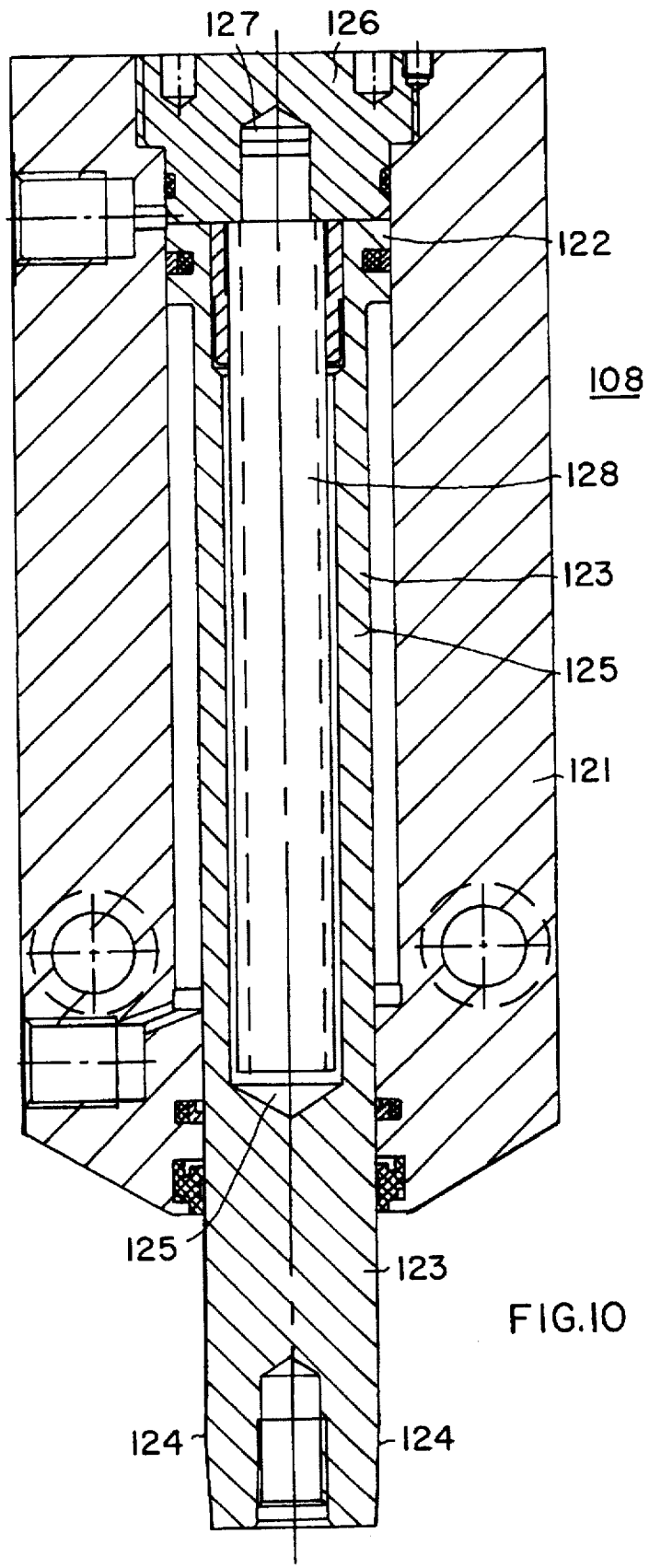
FIG. 10 is an enlarged cross section of the tool receiving device mounted on the machining element of the yoke shown in FIG. 5.

As shown in FIG. 10, the tool receiving apparatus 108 comprises a cylinder housing 121 in which a piston 122 with a piston rod 123 is guided. The piston rod 123 is conically tapered in a tool attachment region 124 at its free end, so that a secure seating is ensured for tools provided with a conically tapered seating bore. The piston rod 123 has a hollow interior chamber 125 that can be embodied as a multi-sided hole or channel, as a triangular or other polygonal channel, or an oval cross-section or even a multi-wedged shaped channel, for example.

The foot portion 126 of the cylinder housing 121 is embodied as an end closure member and is simultaneously provided with a press-fit hole 127, into which a guide rod 128 is pressed. This guide rod 128 is guided within the hollow chamber 125 so that the piston rod 123 glides along the guide rod 128 in the cylinder housing 121. The cross-sectional form or shape of the guide rod 128 must correspond to the cross-sectional shape of the hollow chamber 125. In this manner, the guidance of the piston rod 123 is determined and fixed in its rotational position, that is to say, the piston rod 123 glides along the guide rod 128 in a rotationally secured manner.

Figure 11:
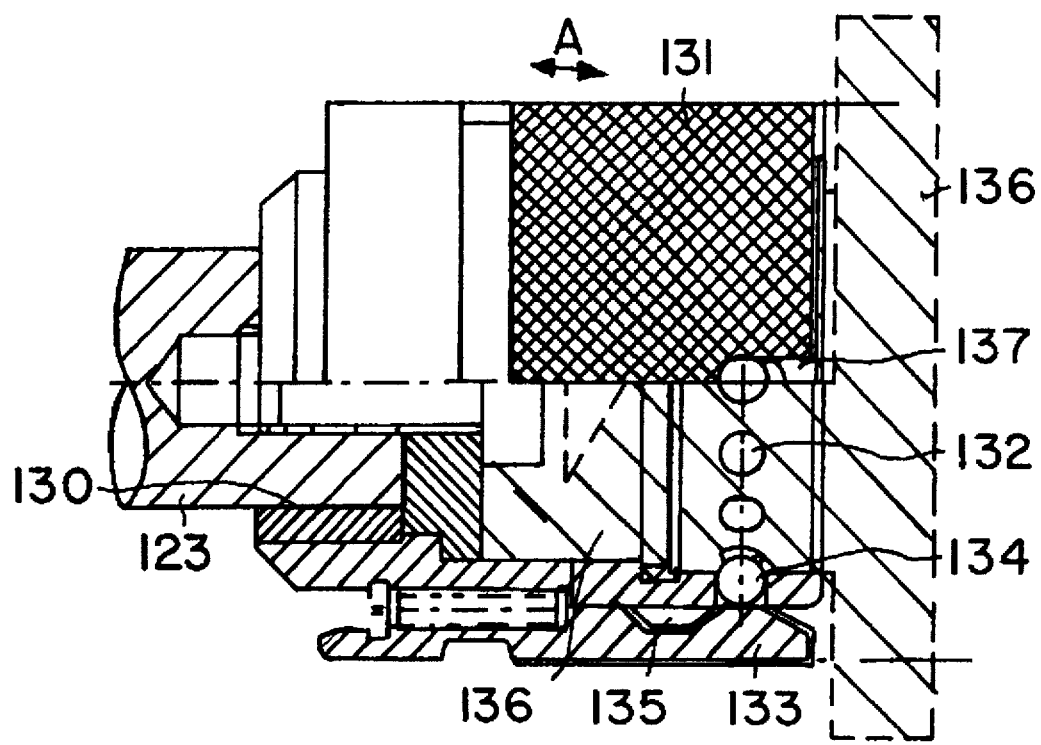
FIG. 11 is a cross section of a quick clamping arrangement for receiving a tool.

As described above, the piston rod 123 is preferably provided with a conically tapered end portion forming a tool attachment region 124. If it will be necessary to exchange tools often, then it is preferable to mount a quick clamping coupling 129 onto the piston rod 123, so that the coupling 129 remains permanently on the piston rod 123 and receives the various individual tools in a quickly exchangeable manner. A quick clamping coupling 129 according to the invention includes a conically tapered bore hole 130, by which the coupling 129 is mounted onto the piston rod 123, as shown in FIG. 11. A ball or bearing ring 131 is provided for receiving the respective tool. A row of balls 132 are arranged in respective holes 134 around the circumference of an inner surface of the ring 131. The ring 131 is slidingly received in the housing 133 of the coupling 129, so that the ring 131 is axially slideable over a predetermined axial distance in the direction of arrows A. This axial sliding motion or shifting of the ball ring 131 serves to move the balls 132 within the ring. More specifically, the balls 132 are movably guided in the holes 134 in the ball ring 131 and are braced or supported against the housing 133, while a groove 135 encircles an inner surface of the housing 133 to receive the balls 132.

FIG. 11 shows the ball ring 131 in its operating position. The balls 132 are contacted by the inner surface of the housing 133 and are thereby pressed through the bored holes 134, without being able to fall out of these bored holes. A tool that has been inserted into the quick coupling 129 and that has a circumferentially encircling groove in the area of the ball ring 131, is thereby held in its position in a fixed or non-extractable manner, because the balls 132 engage the groove provided on the tool. However, if the ball ring 131 is pushed or slid away as indicated by the arrow A in FIG. 11, then the balls 132 are pressed into the groove 135 of the housing 133 so that they are brought out of engagement with the groove of the tool, which may then be removed from the coupling 129.

The mounting of tools on the piston rod 123 is to be carried out in such a manner that the tools are secured against rotation. For this reason, the piston rod 123 is mounted in the cylinder housing 121 in a non-rotational or rotationally secured manner. Such an attachment also applies to the quick clamping coupling 129, but does not apply quite so simply to the tools that are mounted in the quick coupling 129. In order to fix the tools 136 in the quick coupling 129 in a rotationally secured manner, i.e. such that the tools cannot rotate relative to the quick coupling 129, a lengthwise extending groove 137 is axially milled into the inner wall of the quick clamping coupling 129, whereby an inserted tool will engage the lengthwise groove 137. More specifically, each tool has a pin that protrudes from the tool's mounting shaft and that has a width or thickness corresponding to that of the lengthwise groove 137. When the tool is inserted into the quick clamping coupling 129, the pin of the tool is engagingly inserted into the lengthwise groove 137. Thereby the tool is non-rotationally mounted.

Although the invention has been described with reference to specific example embodiments, it will be appreciated that it is intended to cover all modifications and equivalents within the scope of the appended claims.

What is claimed is:

1. An assembly stand adapted to receive and support a work piece that is to be machined, and adapted to be positionable on and displaceable across a work table to carry said work piece to at least one machining station, said assembly stand comprising a pallet, a work piece receiving apparatus mounted on said pallet and includinig a swivel head, a work piece clamping apparatus rotatably supported on said swivel head so as to be rotatable in incremental rotational steps, and a work piece receiving mandrel mounted on said clamping apparatus and adapted to receive and hold the work piece thereon, wherein said work piece receiving apparatus is adapted to rotate the work piece about at least a horizontal first axis and a second axis orthogonal to said first axis, an air conduit system arranged in said pallet, and a plurality of sliding and fixing elements mounted on a bottom side of said pallet, wherein said air conduit system comprises a pressurized air conduit adapted to be connected to a source of compressed air, a connector conduit connected to said sliding and fixing elements, and a pneumatic control unit adapted to selectively reverse an air flow direction of air in said connector conduit between a first state in which an over-pressure is achieved in said sliding and fixing elements and said assembly stand hovers over said work table on an air cushion and a second state in which an under-pressure is achieved in said sliding and fixing elements and said assembly stand is fixed onto said work table.

2. An assembly stand adapted to receive and support a work piece that is to be machined, and adapted to be positionable on and displaceable across a work table to carry said work piece to at least one machining station, said assembly stand comprising a pallet, an air conduit system arranged in said pallet, and a plurality of sliding and fixing elements mounted on a bottom side of said pallet, wherein said air conduit system comprises a pressurized air conduit adapted to be connected to a source of compressed air, a connector conduit connected to said sliding and fixing elements, and a pneumatic control unit adapted to selectively reverse an air flow direction of air in said connector conduit between a first state in which an over-pressure is achieved in said sliding and fixing elements and said assembly stand hovers over said work table on an air cushion and a second state in which an under-pressure is achieved in said sliding and fixing elements and said assembly stand is fixed onto said work table, and wherein said sliding and fixing elements each comprise a metal body having a stepped recess therein, and a substantially cup-shaped elastic material insert member arranged in said stepped recess, wherein a hole passes through the center of said metal body and said insert member into a hollow chamber of said insert member, and said connector conduit is connected to said hollow chamber through said hole.

3. The assembly stand of claim 2, wherein said stepped recess has a plurality of step edges, and said insert member comprises a sidewall rim that lies against said step edges.

4. The assembly stand of claim 3, wherein said pneumatic control unit comprises a control valve, and an ejector connected to said pressurized air conduit and to said connector conduit.

5. The assembly stand of claim 1, wherein said pneumatic control unit comprises a control valve, and an ejector connected to said pressurized air conduit and to said connector conduit.

6. The assembly stand of claim 1, further comprising a positioning mechanism mounted on said bottom side of said pallet.

7. An assembly stand adapted to receive and support a work piece that is to be machined, and adapted to be positionable on and displaceable across a work table to carry said work piece to at least one machining station, said assembly stand comprising a pallet, an air conduit system arranged in said pallet, a plurality of sliding and fixing elements mounted on a bottom side of said pallet, and a positioning mechanism mounted on said bottom side of said pallet, wherein said air conduit system comprises a pressurized air conduit adapted to be connected to a source of compressed air, a connector conduit connected to said sliding and fixing elements, and a pneumatic control unit adapted to selectively reverse an air flow direction of air in said connector conduit between a first state in which an over-pressure is achieved in said sliding and fixing elements and said assembly stand hovers over said work table on an air cushion and a second state in which an under-pressure is achieved in said sliding and fixing elements and said assembly stand is fixed onto said work table, and wherein said positioning mechanism comprises at least one pair of guide rails arranged non-parallel to each other in a V-shape, and a cross-rail arranged across a narrow end of said V-shape.

8. The assembly stand of claim 7, in combination with said work table, wherein said work table includes disks positioned and mounted on a table surface of said work table, and wherein said guide rails are adapted to slide over and receive therebetween said disks to fix a position of said pallet on said work table.

9. The assembly stand in combination with said work table according to claim 8, wherein said disks have various diameters, and wherein said guide rails are configured so as to engage said disks having various diameters between said guide rails at different distances into said V-shape.

10. The assembly stand in combination with said work table according to claim 9, wherein said disks are slideably adjustably mounted on said work table.

11. The assembly stand of claim 1, wherein said incremental rotational steps are 90° rotational steps.

12. An assembly stand adapted to receive and support a work piece that is to be machined, and adapted to be positionable on and displaceable across a work table to carry said work piece to at least one machining station, said assembly stand comprising a pallet, a work piece receiving apparatus mounted on said pallet, a plurality of sliding and fixing elements that are mounted on a bottom side of said pallet and that each include an elastic insert member enclosing a hollow chamber that can be sealed against said work table, an air conduit connected to said hollow chambers of said sliding and fixing elements, and a plurality of guide rails that are arranged non-parallel to each other in a v-shape on said bottom side of said pallet and that are adapted to slide over and receive therebetween disks of various diameters for positioning said assembly stand.

13. A machining system comprising a machining station for machining a work piece) and an assembly stand adapted to receive and support the work piece that is to be machined, and adapted to be positionable on and displaceable across a work table to carry said work piece to at least one said machining station, stand assembly stand comprising a pallet, an air conduit system arranged in said pallet, and a plurality of sliding and fixing elements mounted on a bottom side of said pallet, wherein said air conduit system comprises a pressurized air conduit adapted to be connected to a source of comressed air, a connector conduit connected to said sliding and fixing elements, and a pneumatic control unit adapted to selectively reverse an air flow direction of air in said connector conduit between a first state in which an over-pressure is achieved in said sliding and fixing elements and said assembly stand hovers over said work table on an air cushion and a second state in which an under-pressure is achieved in said sliding and fixing elements and said assembly stand is fixed onto said work table, and said machining station comprising a base plate, a machine stand rigidly mounted on said base plate, a U-shaped yoke having a plurality of holes therethrough, a linear guide movably connecting said yoke to said machine stand, a machining arm connected to said yoke at a first location on said yoke, a support arm connected to said yoke at a second location on said yoke, and a tool receiving apparatus mounted on said machining arm and adapted to receive any one of a plurality of different tools in a rotationally fixed manner.

14. The machining system of claim 13, wherein said U-shaped yoke comprises two side plates connected together and forming the sides of a U-shaped cross-section, said holes are spaced as close together as practically possible along said yoke and pass through both of said side plates in alignment, and said support arm and said machining arm are connected to said yoke via said holes with an adjustable spacing from each other.

15. The machining system of claim 13, wherein said support arm and said machining arm are location-adjustably and direction-reversibly connected to said yoke.

16. The machining system of claim 13, wherein said tool receiving apparatus comprises a cylindrical housing with a foot portion closing one end thereof, a piston rod with a hollow chamber therein arranged in said housing, and a guide rod attached to said foot portion of said housing and reaching into said hollow chamber.

17. The machining system of claim 16, wherein said guide rod and said hollow chamber each repectively have a corresponding cross-sectional shape that prohibits relative rotation of said guide rod in said hollow chamber.

18. The machining system of claim 16, wherein said piston rod has a free end with a conically tapered surface forming a tool attachment portion.

19. The machining system of claim 13, further comprising a quick clamping coupling mounted on said tool receiving apparatus, wherein said coupling comprises a ball ring having a plurality of balls arranged in a ring member, and has an axial groove for receiving a protruding pin of an inserted tool shaft for rotationally fixing said tool shaft, and wherein said ring member is axially slideable to move said balls out of an operating cylindrical plane so as to receive said inserted tool shaft.

20. The machining system of claim 13, wherein said linear guide comprises respective pairs of rollers securely rotatably attached to said machine stand, and a glide rail rigidly attached to said yoke and slidingly engaged between said pairs of rollers.

21. The machining system of claim 13, further comprising a piston-cylinder device including a cylinder connected to said machine stand and a piston rod connected to said yoke, so that said yoke, said machining arm and said support arm are lifted by pressurizing said piston-cylinder device.

22. The machining system of claim 21, wherein said piston-cylinder device is pressurized with a pressure just sufficient to overcome the total weight exerted on said piston-cylinder device.

* * * * *

UNITED STATES PATENT AND TRADEMARK OFFICE
CERTIFICATE OF CORRECTION

PATENT NO. : 5,715,585
DATED : Feb. 10, 1998
INVENTOR(S) : Zachau et al.

It is certified that error appears in the above-identified patent and that said Letters Patent is hereby corrected as shown below:

| | | |
|---|---|---|
| Col. 5, | line 23, | after "channel 23." insert a paragraph spacing; |
| Col. 8, | line 63, | after "and" delete "includinig" and instead insert --including--; |
| Col. 10, | line 56, | after "work" delete "piece)" and instead insert --piece,--; |
| | line 61, | before "assembly" delete "stand" and instead insert --said--. |

Signed and Sealed this

Twenty-first Day of April, 1998

Attest:

BRUCE LEHMAN

*Attesting Officer*     *Commissioner of Patents and Trademarks*